Feb. 16, 1960
V. N. ALBERTSON ET AL
2,924,929
GRASS TRIMMER WITH FLUID MOTOR
Filed April 28, 1958
2 Sheets-Sheet 1
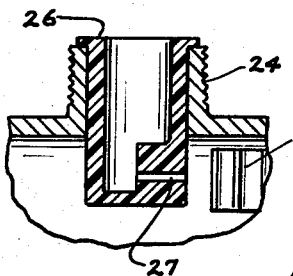
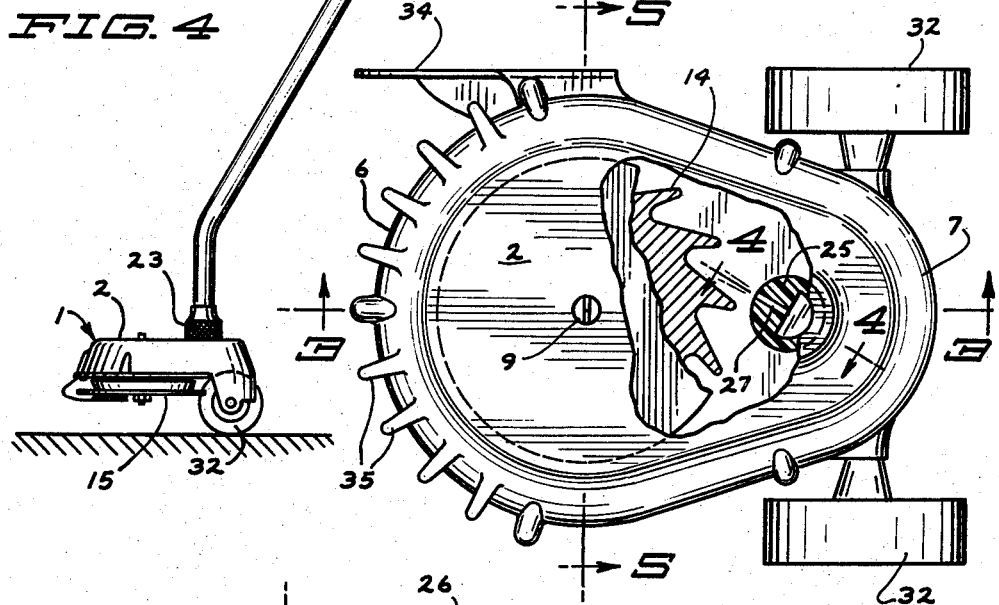
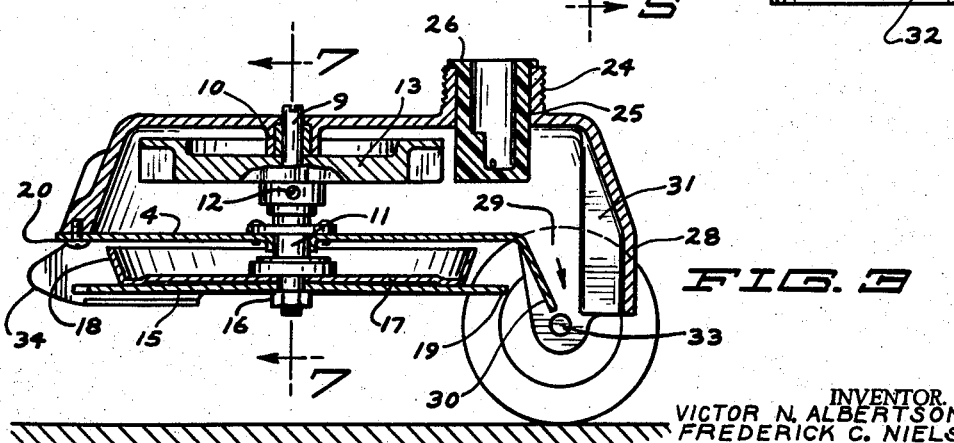
INVENTOR.
VICTOR N. ALBERTSON
FREDERICK C. NIELSEN
BY RUEBEN E. PAULSON
Merchant & Merchant
ATTORNEYS Feb. 16, 1960    V. N. ALBERTSON ET AL    2,924,929
GRASS TRIMMER WITH FLUID MOTOR
Filed April 28, 1958    2 Sheets-Sheet 2
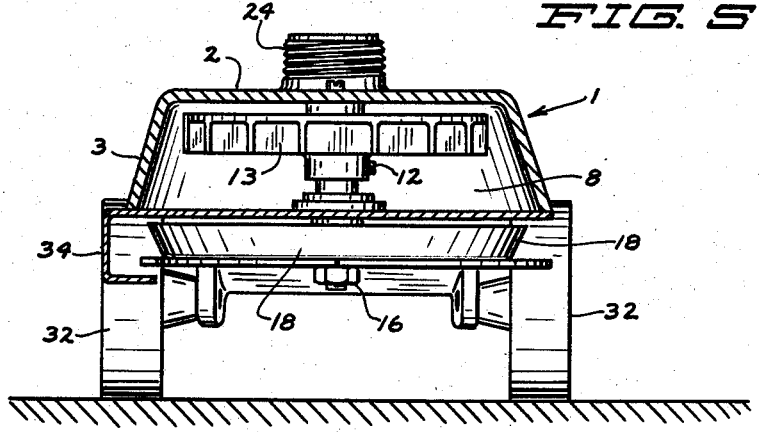
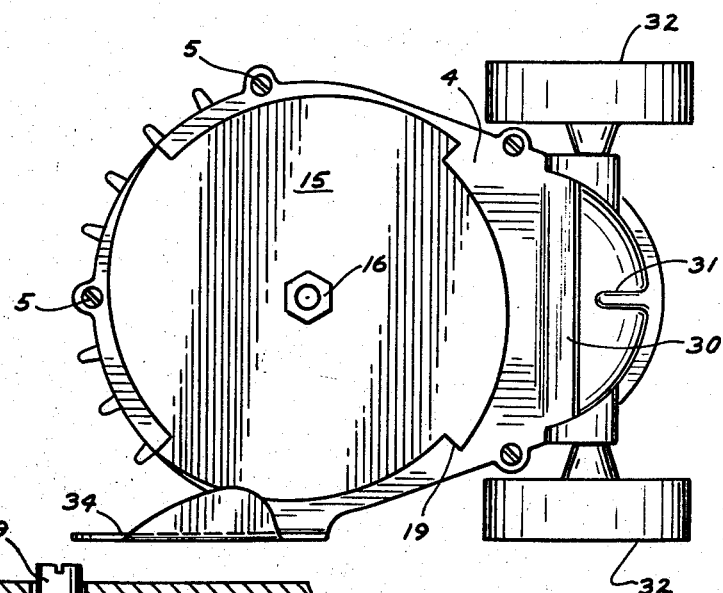
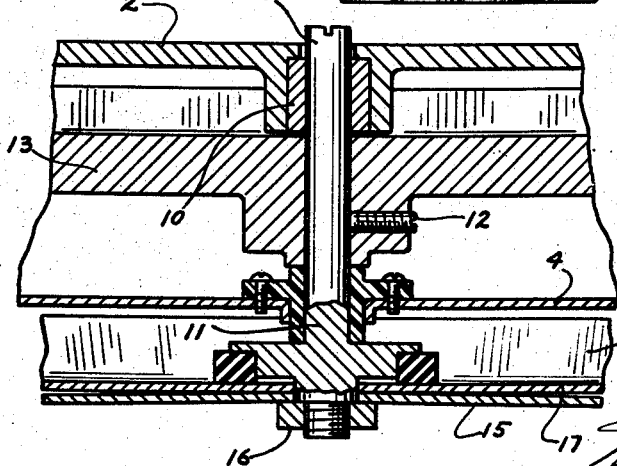
INVENTOR.
VICTOR N. ALBERTSON
FREDERICK C. NIELSEN
BY RUEBEN E. PAULSON
ATTORNEYS

United States Patent Office 2,924,929
Patented Feb. 16, 1960

2,924,929

GRASS TRIMMER WITH FLUID MOTOR

Victor N. Albertson, Rueben E. Paulson, and Frederick C. Nielsen, Minneapolis, Minn.

Application April 28, 1958, Serial No. 731,495

3 Claims. (Cl. 56—25.4)

Our invention relates to lawn or grass trimmers and more particularly to power devices of this type.

The primary object of our invention is the provision of a device of the class above described which is provided with a fluid motor and which can therefore be operated through the medium of a flexible hose connected to and emanating from any conventional source of water under pressure.

A further object of our invention is the provision of a device of the class immediately above described which has a minimum of working parts and which is extremely inexpensive to produce and maintain.

A further object of our invention is the provision of a device of the class above described which may be operated with a minimum of skill, and which is highly efficient in its operation.

The above and still further objects of our invention will become apparent from the following detailed specification, appended claims and attached drawings.

Referring to the drawings wherein like characters indicate like parts throughout the several views:

Fig. 1 is a view in side elevation of our novel structure;

Fig. 2 is an enlarged view in top plan of the structure of Fig. 1, some parts being removed, some parts being broken away and some parts shown in section;

Fig. 3 is a sectional view as seen substantially from the line 3—3 of Fig. 2;

Fig. 4 is a fragmentary sectional view as seen from the line 4—4 of Fig. 2;

Fig. 5 is a view in section as seen from the line 5—5 of Fig. 2;

Fig. 6 is a view in bottom plan of the structure of Fig. 2; and

Fig. 7 is an enlarged fragmentary view in section as seen substantially from the line 7—7 of Fig. 3.

Referring with greater particularity to the drawings, the numeral 1 indicates in its entirety a housing comprising a plate-like upper wall 2, a depending peripheral wall 3, and a bottom wall 4 which, preferably and as shown, is detachably secured to the peripheral wall 3 by means of circumferentially spaced screws or the like 5.

Preferably and as shown particularly by Figs. 2 and 6, the housing 1 is generally ovate in shape and defines an enlarged arcuate forward portion 6 and a reduced rear end portion 7, the walls 2, 3 and 4 thereof defining a chamber 8.

A vertically disposed rotary shaft 9 projects through and is journaled for rotation in bearings 10 and 11 respectively carried by the top and bottom walls 2, 4 respectively. Rigidly secured to the shaft 9, by means of a set screw or the like 12, within the chamber 8 is an impeller 13 having circumferentially spaced vanes 14 thereon. Preferably and as shown, the shaft 9 and impeller 13 are concentric with the arcuate forward end portion 6 of the housing 1 as is the rotary cutter blade 15 fast on the nut-equipped lower end portion 16 of the shaft 9. As shown particularly in Fig. 7, the bearing 11 spaces the cutter blade 15 below the bottom wall 4 sufficiently to accommodate therebetween and said bottom wall 4 a disc-like member 17 also fast on the shaft 9. The member 17 at its peripheral edge defines an upwardly and outwardly projecting annular flange 18 which is disposed immediately radially inwardly of the cutting teeth 19 of the cutter blade 15 and which tends to prevent cut grass and dirt from accumulating or caking on or about the bearing 11 and the shaft 9 and cutter blade 15 carried thereby. Preferably and as shown, the cutting teeth 19 are immediately below the lower edge 20 of the arcuate forward end 6 of the housing 1.

A tubular rigid conduit 21, preferably and as shown formed to provide a suitable handle 22 at its upwardly and rearwardly projected end, is provided with means at its lower end for detachably securing same to the top wall 2 of the housing 1 in rearwardly spaced relation to the impeller 13. Preferably, this is accomplished by means of an annular clamping nut 23 having screw threaded engagement with an upstanding tubular sleeve 24 preferably formed integrally with the top wall 2. As shown in Fig. 3, a socket-like nozzle 25, having a radially projecting flange 26 at its upper end, is nestingly received within the sleeve 24, whereby to direct its radial outlet passage 27 generally tangentially of the impeller 13 so that a jet of water fed therethrough under pressure will impinge against the vanes 14 thereof. A conventional compressible washer, not shown, is normally interposed between the lower end portion of the conduit 21 and the flange 26 of the nozzle 25.

At its rear end portion 7, the housing 1 is formed to provide a splash guard 28 which projects below the plane of the bottom wall 4 and defines the rear wall of a discharge passage 29 leading from the chamber 8, see particularly Fig. 3. As there shown, the rear end portion of the bottom wall 4 is formed to provide a downwardly and rearwardly extending lip 30 which terminates in spaced relation to the splash guard 28 and defines therewith the front wall of the fluid passage 29.

Preferably and as shown in Fig. 3, the splash guard 28 is formed to provide a central forwardly projecting vertical web 31 which breaks up the circular flow imparted to fluid in the chamber 8 by the impeller 13 and thus facilitates its discharge through the outlet 29.

At its rear end portion 7, the housing 1 is provided with a pair of spaced wheel elements 32 which, and as shown, are journaled on stub axles 33 projecting laterally outwardly from opposite side portions of the splash guard 28.

Also preferably and as shown, one side of the housing 1 is formed to provide a forwardly projecting gathering arm 34 which is designed to engage or come into close contact with a wall or the like, thus gathering blades of grass inwardly where they may be engaged by the cutting teeth 19 of the cutter blade 15. As shown in Fig. 3, the gathering arm 34 extends downwardly below the plane of the cutter blade 15 and thus tends to prevent the teeth 19 from engaging the ground in the event that the forward end portion 6 of the housing 1 is lowered sufficiently to cause engagement of the arm 34 with the ground. Also preferably and as shown, the arcuate forward portion of the housing 1 is formed to provide conventional circumferentially spaced comb-like teeth 35.

When a conventional hose 36 is coupled to the handle-equipped upper end of the conduit 21 and water under pressure fed therethrough, the impeller 13 will be caused to rotate at speeds more than adequate to cause the cutting teeth 19 of the cutter blade 15 to sever any blades of grass into which they come in contact. It will be noted that the peripheral wall 3 slopes outwardly and downwardly away from the peripheral edge portion of the impeller 13 toward the bottom wall 4. This sloping of the wall 3 prevents water thrown outwardly from the impeller 13 from splashing inwardly against the impeller to retard rotation thereof, and directs the water downwardly toward the bottom wall 4 from whence it flows toward the passage 29. Thus, back pressure against the impeller 13 is substantially eliminated. The fluid within the chamber 8 is permitted to escape through the rearwardly disposed passage 29, thereby depositing same on the cut grass and assuring the uncut grass from becoming wet and matted. The splash guard 28 prevents fluid emanating from the discharge passage 29 from projecting rearwardly onto the feet of the operator.

Our invention has been thoroughly tested and found to be completely satisfactory for the accomplishment of the above objects and while we have shown a preferred embodiment thereof, we wish it to be specifically understood that same is capable of modification without departure from the scope and spirit of the appended claims.

What we claim is:

1. In a lawn trimmer, a housing defining a chamber and including a top wall, a depending peripheral wall and a bottom wall, a rotary shaft journaled in said top and bottom walls, a vane-equipped impeller secured to said shaft and rotatable therewith in said chamber, a rotary cutter blade carried by said shaft below said bottom wall, and a tubular conduit carried by said top wall and projecting upwardly therefrom, the lower end of said conduit projecting through said top wall and terminating in a nozzle discharging fluid under pressure generally tangentially of said impeller and against the vanes thereof, said bottom wall rearwardly of said cutter blade terminating in spaced relation to the peripheral wall of said housing to provide therebetween and said housing a fluid outlet.

2. The structure defined in claim 1 in further combination with wheel means secured to said peripheral wall only rearwardly of said shaft.

3. The structure defined in claim 1 in which the forward end of said housing is arcuate on an axis generally concentric with said shaft, and in which the rear end portion of said peripheral wall projects downwardly below the plane of said bottom wall and defines a splash guard, the rear end portion of said bottom wall defining a downwardly and rearwardly extended lip which terminates in spaced relation to said splash guard and defines the front wall of said fluid outlet spout.

References Cited in the file of this patent
UNITED STATES PATENTS

| | | |
|---|---|---|
| 1,814,649 | Wade | July 14, 1931 |
| 2,523,014 | Gooch | Sept. 19, 1950 |
| 2,547,328 | Koch et al. | Apr. 3, 1951 |
| 2,671,299 | Orr | Mar. 9, 1954 |
| 2,787,881 | McDaniel | Apr. 9, 1957 |
| 2,836,024 | Davis et al. | May 27, 1958 |